3,544,591
PREPARATION OF 2,4-BIS(HEXAFLUOROISOPRO-
PYLIDENE) - 1,3 - DITHIETANE AND FLUORI-
NATED POLYSULFIDES BY REACTION OF PER-
FLUOROISOBUTENE WITH AN ALKALI METAL
SULFIDE
David C. England, Wilmington, Del., assignor to E. I.
du Pont de Nemours and Company, Wilmington, Del.,
a corporation of Delaware
No Drawing. Continuation-in-part of application Ser. No.
512,191, Dec. 7, 1965. This application Aug. 21, 1967,
Ser. No. 661,843
Int. Cl. C07d 69/00; C07c 149/12; C08f 45/46
U.S. Cl. 260—327                      7 Claims

ABSTRACT OF THE DISCLOSURE

Preparation of 2,4-bis(hexafluoroisopropylidene)-1,3-dithietane by the reaction of perfluoroisobutene with an alkali metal sulfide, including polysulfide, e.g., $M_2S$, $M_2S_3$, $M_2S_4$, etc., where M is sodium, potassium or cesium. Also compounds, essentially by-products of some variations of the process, bis(perfluoro-tert-butyl) trisulfide and bis(perfluoro-tert-butyl) tetrasulfide. Both of these compounds are useful as solvents for fluorinated polymers.

RELATED APPLICATION

This application is a continuation-in-part of my copending application Ser. No. 512,191, filed Dec. 7, 1965 and now abandoned.

FIELD AND SUMMARY OF THE INVENTION

This invention relates to, and has as its principle object provision of, a new and improved chemical process primarily for synthesizing 2,4-bis(hexafluoroisopropylidene)-1,3-dithietane (I) by reacting perfluoroisobutene with an alkali metal sulfide. A subsidiary object is the provision of two novel compounds which are essentially by-products of variations of the process, bis(nonaperfluoro-tert-butyl) trisulfide (II) and bis(nonafluoro-tert-butyl) tetrasulfide (III). The latter compounds II and III may be also referred to as bis(perfluoro) compounds.

BACKGROUND AND DETAILS OF THE INVENTION

The principal product I of the process of this invention, which has the formula

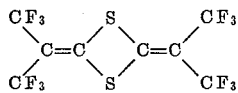

is a solid melting at 84.5–85.5° C. and boiling at 173° C. at atmospheric pressure. This compound is described and claimed in the Raasch U.S. Pat. 3,275,609. Compound I is useful as a heat-transfer medium, and further useful by virtue of the fact that, on pyrolysis at 450–900° C., it is converted to bis(trifluoromethyl)thioketene,

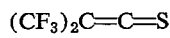

i.e., to the monomer of which it is the cyclic dimer. Bis(trifluoromethyl)thioketene itself is a new compound, also described and claimed in the above-mentioned patent, which is characterized by great chemical activity and utility as a source of new polymers, as a modifying agent for natural rubber and as a water repelling agent for use on wool.

As described in the Raasch patent, 2,4-bis(hexafluoroisopropylidene)-1,2-dithietane is prepared by reacting a 2,4 - bis(dicarbalkoxymethylene)-1,3-dithietane with at least a stoichiometric amount of sulfur tetrafluoride at a temperature of at least 100° C. and in the presence of an inorganic fluoride ion acceptor such as hydrogen fluoride. The reaction is represented by the equation:

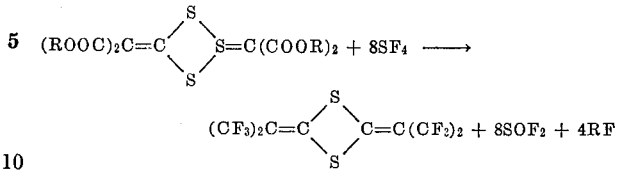

where R is an alkyl group. The organic starting material is itself prepared by reaction of a dialkyl sodiomalonate with thiophosgene in accordance with the equation:

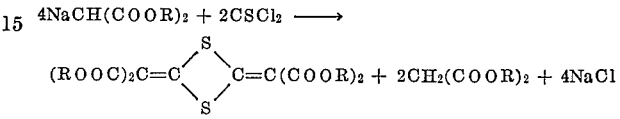

The present invention provides a simpler and more practical preparative method. In accordance with this method, 2,4 - bis(hexafluoroisopropylidene)-1,3-dithietane is prepared by reacting a fluoroolefin of the formula $(CF_3)_2C=CX_2$, where X is fluorine or chlorine, with an alkali metal sulfide in a molar ratio of inorganic to organic reactant between 0.1:1 and 10:1, at a temperature in the range of −80° C. to +150° C. and in an inert, substantially neutral organic liquid medium which is at least a partial solvent for alkali metal sulfide.

This reaction is represented by the equation:

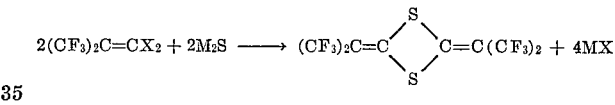

where M is an alkali metal. When $M_2S$ contains also $M_2S_2$, $M_2S_3$, $M_2S_4$, etc., further reactions take place yielding additional compounds of the formula $$(CF_3)_3C—S_n—C(CF_3)_3$$

where $n$ is 3 or 4, as illustrated when X=F.

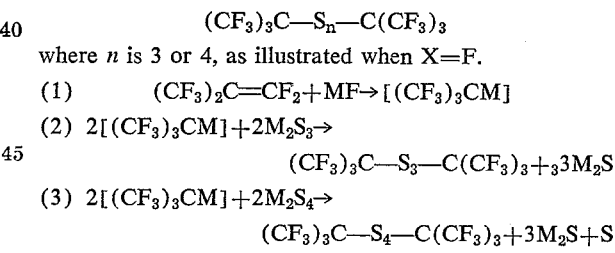

Because of the interrelationship of all the above reactions, a combination of MX and sulfur can be substituted for $M_2S$ as shown in the examples. In the presence of such added sulfur the choice of cesium for M favors the formation of larger proportions of $$(CF_3)_3C—S_4—C(CF_3)_3$$

i.e., Equation 4, and the choice of potassium for M favors the formation of larger proportions of $$(CF_3)_3C—S_4—C(CF_3)$$

i.e., Equation 5.

Any alkali metal sulfide can be used in this process. Potassium sulfide and sodium sulfide are preferred but the sulfides of the other alkali metals, e.g., lithium, rubidium and cesium sulfides, are also suitable. Alkali metal polysulfides, for example potassium pentasulfide ($K_2S_5$) or sodium tetrasulfide ($Na_2S_4$), can be used in place of the monosulfides.

The fluoroolefin is preferably 2 - (trifluoromethyl)-pentafluoropropene (referred to for brevity as perfluoroisobutene) but 1,1 - dichloro - 2 - (trifluoromethyl) - 3,3,3-trifluoropropene, a known compound, can also be used with substantially equivalent results. Perfluoroisobutene can be used as the isolated, essentially pure product but it is also possible to use as the starting material one of the crude gas mixtures, containing varying amounts of perfluoroisobutene, that are obtained by pyrolyzing in the temperature range of 500–1000° C. one of the fluorinated compounds known to produce perfluoroisobutene under such conditions, such as tetrafluoroethylene, polytetra- or fluoroethylene or perfluorocyclobutane. The direct use of such a crude gas mixture, which is advantageous from the economic standpoint and represents a preferred embodiment of the invention, is illustrated in one of the examples that follow.

The reactant ratio is not critical since the reaction will proceed regardless of what it is. Normally, the alkali metal sulfide is employed in a molar ratio of 0.1:1 to 10:1, preferably 0.5:1 to 3:1, relative to the fluoroolefin.

The reaction is conducted in an organic liquid medium capable of dissolving the alkali metal sulfide to at least some extent, e.g., 2% by weight. Any solvent which is substantially neutral and inert towards the reactants and reaction products is suitable for this purpose. Examples of such reaction media include acyclic or cyclic ethers such as di-n-butyl ether, 1,2-dimethoxyethane, 1,2-diethoxyethane, tetrahydrofuran and dioxane; N,N-dialkyl aliphatic amides such as N,N-dimethylformamide, N,N-diethylformamide or N,N-dimethylacetamide; nitriles such as acetonitrile, propionitrile, benzonitrile or adiponitrile; aliphatic alcohols such as ethanol, butanol or cyclohexanol; sulfides, sulfoxides and sulfones such as diethyl sulfide, di-n-butyl sulfide, dimethyl sulfoxide, diethyl sulfoxide or cyclic tetramethylene sulfone; aliphatic nitro compounds such as nitromethane or nitroethane; acyclic or cyclic ketones such as acetone, methyl ethyl ketone or cyclohexanone; lower alkyl esters of alkanoic acids such as ethyl acetate, methyl propionate or methyl butyrate; and the like. The reaction medium need not be anhydrous; thus, hydrated alkali metal sulfides can be used, as illustrated in one of the examples that follow. However, for best results, the reaction mixture should not contain more than about 50% of water, based on the weight of the organic medium present.

The reaction, which is exothermic, at least initially, proceeds at temperatures as low as −80° C. The preferred temperature range is that between −80 and +50° C. but higher temperatures can be used if desired although it is generally recommended not to exceed about 150° C. The pressure is immaterial. Atmospheric pressure is generally used for convenience but, especially in the higher ranges of reaction temperature, closed vessels can be used, the pressure in the system being the autogenous pressure developed by the reactants and reaction medium at the operating temperature. Depending on such factors as the temperature and the solvent power of the reaction medium, substantial conversions of the fluoroolefin are obtained in periods ranging from a few minutes to a few hours.

EMBODIMENTS OF THE INVENTION

The following nonlimiting examples, in which parts, percentages, and the like are in terms of weight unless otherwise noted, illustrate the invention in greater detail. The potassium sulfide used in most of these examples was commercial sulfurated potash which contains principally $K_2S$ along with small proportions of $K_2S_2$, $K_2S_3$, $K_2S_4$, and higher sulfides.

EXAMPLE 1

A mixture of 22 g. (0.2 mole) of powdered potassium sulfide and 100 ml. of dimethylformamide was magnetically stirred and cooled (0–10° C.) in a 500 ml. 3-neck flask equipped with a thermometer, Dry Ice condenser and gas-inlet tube. Perfluoroisobutene (40 g., 0.2 mole) was added as a gas and, after addition was complete, the mixture was allowed to stand for 60 hours at room temperature. It was then diluted with 100 ml. of water and extracted with ether. After removal of the ether in a current of air, the solid residue was sublimed to give 9.5 g. (24% yield) of crystalline 2,4-bis(hexafluoroisopropylidene) - 1, 3-dithietane. The product was further purified by recrystallization from chloroform, after which it melted at 83–85° C., and it was characterized by mixed melting point with an authentic sample prepared by the method of U.S. Pat. 3,275,609.

EXAMPLE 2

Perfluoroisobutene (40 g., 0.2 mole) was reacted with potassium sulfide (44 g., 0.4 mole) in 100 ml. of dimethylformamide at 0–10° C. as described above. When addition of the perfluoroisobutene was complete, the mixture was allowed to warm to 30° C., 100 ml. of water was added and the mixture was then subjected to steam distillation. From the distillate there was collected by filtration 15.5 g. (40% yield) of 2,4 - bis(hexafluoroisopropylidene)-1,3-dithietane.

EXAMPLE 3

Perfluoroisobutene (40 g., 0.2 mole) was reacted with potassium sulfide (22 g., 0.2 mole) in 100 ml. of 1,2-dimethoxyethane at 0–10° C. as described above. When addition of the perfluoroisobutene was complete, the mixture was heated on a boiling water bath and subjected to reduced pressure (0–5 mm.), applied through a trap cooled in Dry Ice-acetone to 80° C., until all volatile material had distilled into the trap. The material in the trap was then warmed to room temperature, diluted with about 100 ml. of water, and the insoluble solid was collected by filtration. There was obtained 8.5 g. (22% yield) of crystalline 2,4 - bis(hexafluoroisopropylidene)-1,3-dithietane.

EXAMPLE 4

Perfluoroisobutene (40 g., 0.2 mole) was reacted with 44 g. (0.4 mole) of potassium sulfide in 100 ml. of dimethylformamide with cooling to −60° C., and the temperature was kept at 0° C. for 0.5 hour after addition was complete. The mixture was worked up by vacuum distillation to a trap, followed by water dilution and filtration as described in Example 3. There was obtained 10.5 g. (50% yield) of 2,4-bis(hexafluoroisopropylidene)-1,3-dithietane.

EXAMPLE 5

The procedure of Example 4 was repeated substituting 48 g. (0.2 mole) of $Na_2S \cdot 9H_2O$ for the potassium sulfide. The reaction mixture thus contained about 36% of water, based on the weight of the organic reaction medium. The yield of 2,4-bis(hexafluoroisopropylidene)-1,3-dithietane was 17 g. (44%).

EXAMPLE 6

The gas stream obtained by pyrolyzing tetrafluoroethylene through a metal tube at 800° C., and calculated by gas chromatographic analysis to contain about 30% by weight of perfluoroisobutene, was passed into a mixture, cooled to about −80° C., of 44 g. (0.4 mole) of potassium sulfide in 100 ml. of dimethylformamide. The rate of flow of the gas was such that about 5.4 g. of perfluoroisobutene passed through the liquid mixture per minute. After 8 minutes, during which time about 40 g. (0.2 mole) of perfluoroisobutene was brought in contact with the potassium sulfide, the addition was discontinued and the mixture was stirred at 0° C. for 5 minutes, then worked up as described above by vacuum distillation into a trap, water dilution and filtration. There was obtained 5.2 g. (13.4% yield) of 2,4-bis(hexafluoroisopropylidene)-1,3-dithietane.

EXAMPLE 7

A mixture of 44 g. (0.4 mole) of potassium sulfide in 100 ml. of dimethylformamide was magnetically stirred in a flask fitted with a Dry Ice-acetone condenser, thermometer and gas-inlet tube. Perfluoroisobutene gas was added at a rate sufficient to maintain a steady reflux. The temperature in the flask was kept at 35–40° C. Reaction was exothermic at first but soon required heating with a warm water bath. An excess of perfluoroisobutene (128 g., 0.64 mole) was used and the rate of consumption became slow near the end of the addition. The product was worked up as described above by vacuum distillation into a trap, water dilution and filtration. There was obtained 42 g. of 2,4-bis(hexafluoroisopropylidene)-1,3-dithietane (54% yield, based on the potassium sulfide).

The water-diluted filtrate contained an oil which was distilled to give 9.4 g. of distillate, B.P. 74–80° C./20 mm. This was purified by gas chromatography to give a low melting solid which, after crystallization from chloroform, melted at 44° C. This material, whose formation was also observed in other examples, although in smaller amounts, was identified by elemental and spectral analyses as bis(perfluoro-tert-butyl) trisulfide, $$(CF_3)_3C—S—S—S—C(CF_3)_3.$$

*Analyses.*—Calcd. for $C_8F_{18}S_3$ (percent): C, 17.97; F, 64.04; S, 17.97. Found (percent): C, 18.2; F, 62.1; S, 18.1.

The infrared spectrum showed a broad C—F absorption band at 7.5–8.5μ and no C=C absorption. The $F^{19}$ nuclear magnetic resonance spectrum showed a singlet at +63.3 p.p.m. upfield from fluorotrichloromethane as reference.

Bis(perfluoro-tert-butyl) trisulfide is a new compound. It has good solvent power for fluorinated polymers. For example, it forms solutions of low molecular weight polytetrafluoroethylene (melting range 83–150° C., molecular weight 1200–1250). Such a solution, e.g., of about 10% concentration, was used to impregnate paper, after which the impregnated paper was washed with acetone to remove the solvent. The treated paper was water-repellent.

EXAMPLE 8

A mixture of 44 g. of sulfurated potash and 100 ml. of dimethylformamide was stirred in 1-liter, 3-necked flask equipped with Dry Ice condenser, thermometer, and gas inlet tube. Perfluoroisobutene (138 g.) was then added slowly as a gas, keeping the temperature at 35–40° C. When the addition was complete the mixture was allowed to stand overnight at room temperature. Vacuum (about 1 mm.) was then applied through a Dry Ice trap and the mixture was heated with a boiling water bath. The mixture which collected in the trap was diluted with an equal amount of water and filtered to yield 36 g. of 2,4-bis(hexafluoroisopropylidene)-1,3-dithietane. A heavy oil (40 g.) was separated from water in the filtrate. Examination of this oil by analytical gas chromatography showed it to consist of 19.6% 2,4-bis(hexafluoroisopropylidene)-1,3-dithietane, 40% of $(CF_3)_3C—S_3—C(CF_3)_3$, 4.7% of $(CF_3)_3C—S_4—C(CF_3)_3$, and 35.7% of other materials, including one high boiling compound and several low boiling compounds.

EXAMPLE 9

A mixture of 152 g. of cesium fluoride, 64 g. of sulfur, and 250 ml. of dimethylformamide was stirred while 700 g. of octafluoroisobutylene was added as a gas. The reaction was exothermic and was maintained at 60–70° C. by controlling the rate of addition. When the sulfur was consumed during the addition, more was added to give a total of 112 g. of sulfur used. The mixture was then poured into water in a hood (caution: toxic gas evolved) and the mixture was extracted with petroleum ether. Then the organic extract was washed with water, dried, and cooled to −80° C., to precipitate 142 g. of 2,4-bis(hexafluoroisopropylidene)-1,3-dithietane. Distillation of the filtrate gave 326 g. of $(CF_3)_3C—S_3—C(CF_3)_3$, boiling at 96–100° C. at 50 mm. pressure. This product solidified on cooling and was identical with the product in Example 7. A 20 g. fraction boiling up to 123° C. at 50 mm. pressure contained the tetrasulfide $$(CF_3)_3C—S_4—C(CF_3)_3$$

EXAMPLE 10

The procedure of Example 9 was repeated using potassium fluoride in place of cesium fluoride. The tetrasulfide was isolated in a solid fraction boiling at 123–138° C. at 45 mm. pressure. Recrystallization at −80° C. from petroleum ether and then from chloroform gave $(CF_3)_3C—S_4—C(CF_3)_3$, M.P. 74–77° C., $F^{19}$ NMR showed a singlet at +63.3 p.p.m. upfield from fluorotrichloromethane as reference.

*Analyses.*—Calcd. for $C_8F_{18}S_4$ (percent): C, 16.98; S, 22.66. Found (percent): C, 17.36; S, 22.04.

Bis(perfluoro-tert-butyl) tetrasulfide is also a new compound with good solvent power for fluorinated polymers. For example, it dissolves low molecular weight polytetrafluoroethylene (melting range 83–150° C., molecular weight 1200–1250). Such a solution, e.g., of about 10% concentration, was used to impregnate paper, after which the impregnated paper was washed with acetone to remove the solvent. The treated paper was water-repellant.

The embodiments of the invention in which an exclusive property or privilege is claimed are defined as follows.

1. The process which comprises reacting, at a temperature in the range −80° C. to 150° C., a fluoroolefin of the formula $(CF_3)_2C=CX_2$, where X is fluorine or chlorine, with at least one alkali metal sulfide and/or a mixture of an alkali metal fluoride or chloride and free sulfur in an inert substantially neutral organic liquid medium which dissolves alkali metal sulfide to the extent of at least about 2% by weight to obtain 2,4-bis(hexafluoroisopropylidene)-1,3-dithietane and at least one compound of the formula $(CF_3)_2(CX_3)C—S_n(CX_3)(CF_3)_2$ where $n$ is 3 or 4, provided that when only an $M_2S$ alkali metal sulfide is used only 2,4-bis(hexafluoroisopropylidene)-1,3-dithietane is obtained.

2. The process of claim 1 in which the temperature is in the range −80° C. to +50° C.

3. The process of claim 1 in which the alkali metal sulfide is a sulfide of sodium, potassium or cesium.

4. The process of claim 1 in which the liquid medium includes water.

5. The process of claim 1 in which the fluoroolefin is perfluoroisobutene.

6. The process of claim 5 in which the perfluoroisobutene is provided by the crude gas mixture obtained by the pyrolysis, at a temperature in the range 500–1000° C., of a perfluorinated hydrocarbon which produces perfluoroisobutene under such pyrolysis conditions.

7. The process of claim 6 wherein the perfluorinated hydrocarbon is tetrafluoroethylene.

References Cited

UNITED STATES PATENTS 2,970,173   1/1961   Howard et al. _____ 260—607
3,008,966   11/1961   Hauptschein et al. ____ 260—327

CHARLES B. PARKER, Primary Examiner

D. R. PHILLIPS, Assistant Examiner

U.S. Cl. X.R.

260—30.8, 608, 653.3